UNITED STATES PATENT OFFICE.

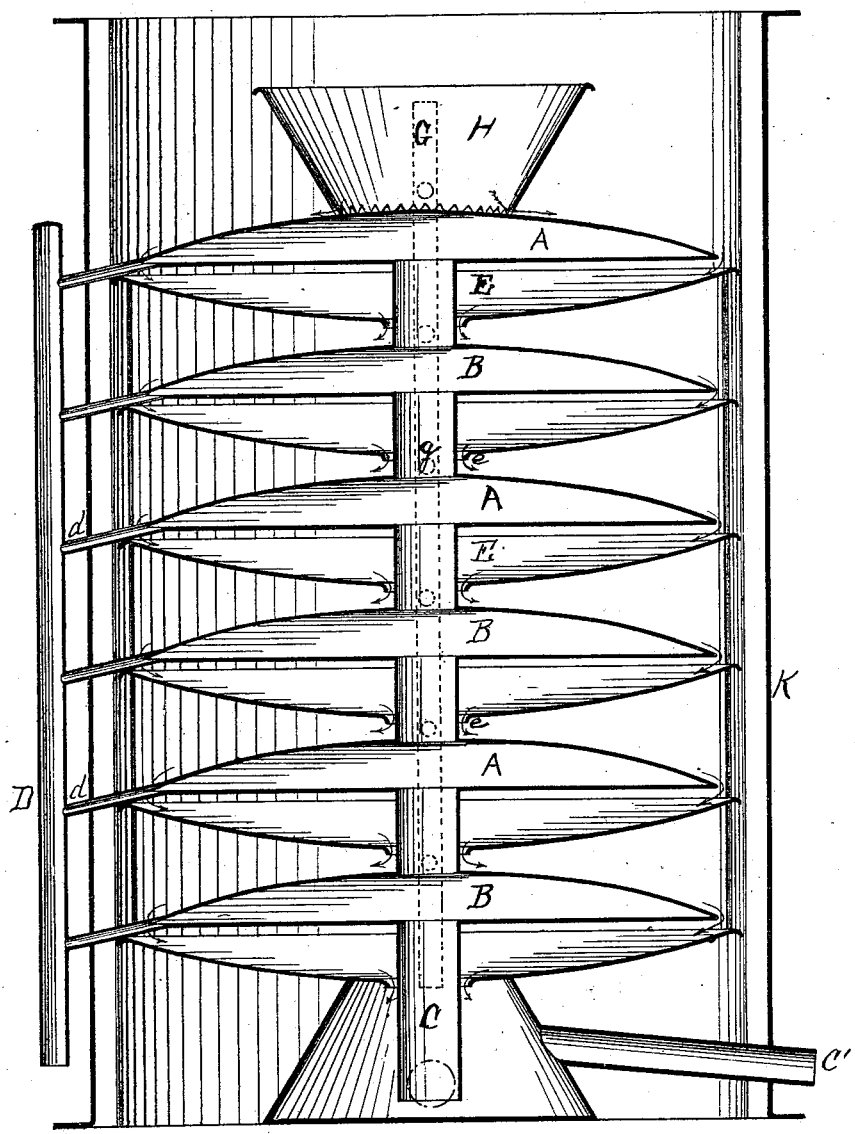

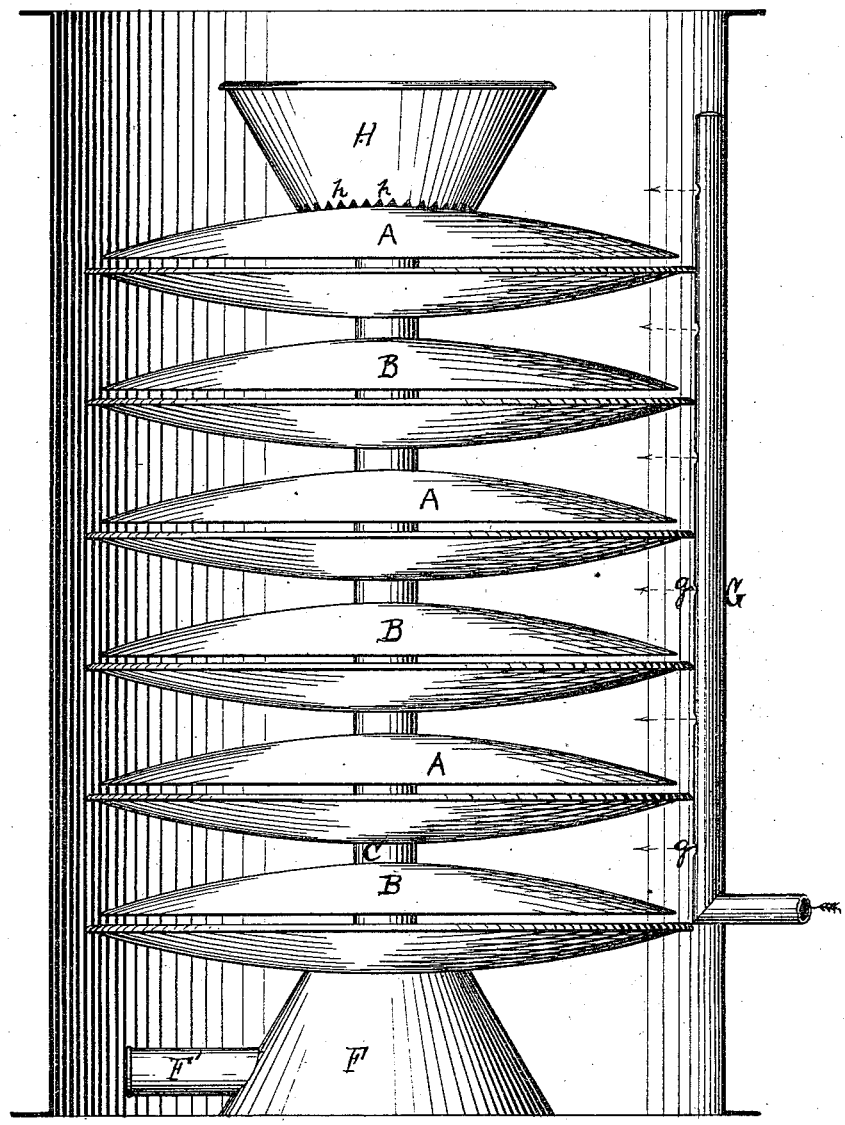

FRANÇOIS RANDON, OF NEW ORLEANS, LOUISIANA.

IMPROVEMENT IN EVAPORATING APPARATUS.

Specification forming part of Letters Patent No. 161,353, dated March 30, 1875; application filed March 16, 1875.

*To all whom it may concern:*

Be it known that I, FRANÇOIS RANDON, of New Orleans, in the parish of Orleans and State of Louisiana, have invented certain Improvements in Evaporating Apparatus, of which the following is a full, clear, and exact description, reference being had to the accompanying drawing and the letters of reference marked thereon, making part of this specification, in which—

Figure 1 is a vertical sectional view. Fig. 2 is a front view, part of the casing being removed.

The nature of my invention consists in constructing an evaporating apparatus with a series of plano-convex deflecting-chambers, the walls of which provide a steam-chamber immediately below the convex deflecting-surface. These chambers are provided with steam or hot air through a vertical central tube, and which communicates through an opening or aperture with each chamber, and in securing, so as to operate in connection with said chambers, a series of concave trays or conveyers, one arranged below each deflecting-surface, and which catches the dripping liquid as it falls, and returns the same, discharging it at a central opening provided between the inner section of the surface of the tray and the heated surface of the central tube. Thus the material, and it matters not whether it be saccharine juice or any other substance to be evaporated, is supplied in thin jets or sprays at the center of the upper of the series of disks, and runs over its oval surface and, falling off the edge of the same, is caught in the tray below, and, owing to its surface falling toward the center of the apparatus, the liquid is instantly conveyed in that direction and discharged through an opening in the apex of the deflecting-surface below, and so on throughout the entire series. And thus the liquid is conveyed in the most rapid manner over an immense evaporating-surface, and which, owing to the steam-chamber which is below each deflector, the entire evaporating-surface over which the liquid passes is so heated as to cause a most rapid and effective evaporation of the liquid, and at nearly a uniform temperature.

My invention also consists in arranging at the rear of the apparatus a vertical air-tube, and which is supplied through a blast with a continuous current of either hot or cold air. This tube has an opening which leads in the open space above each deflecting-surface. These series of openings are constantly discharging blasts of air between the deflecting-surfaces, and which frees the same from any steam which the disks may throw off, and which, if allowed to remain or accumulate, might serve to so choke up the passage as to retard the passage of the liquid as it flows on over the evaporating-surfaces. This apparatus is designed for saccharine liquids and for the treatment of all other liquids in connection with the preparation of which evaporating apparatuses are now used.

The construction and operation of my invention are as follows:

A A are a series of circular deflectors, and are plano-convex in form—that is, their upper surface is convex and their lower is flat. These two surfaces, or upper and lower walls, are relatively so arranged as to provide a close, tight, steam-chamber, B, in connection with each deflector A of the entire series, and thus the convex surfaces of the deflecting-surface, and over which the liquid flows or passes during the process of evaporation, are all treated to a uniform temperature. C is a steam-supply tube and runs vertically through the apparatus, and around which the deflecting-chambers A A are secured, as clearly shown in Fig. 2. This tube has a series of openings, one of which communicates with each of the chambers B. This tube C, by an elbow-connection, is attached to a feed-pipe, C', Fig. 1, and through which steam from a boiler, or the exhaust steam from an engine suitably located, is supplied. D is a vertical discharge-pipe, and by branch tubes $d\ d$ is connected with each of the chambers B B, and which provides a convenient means of carrying off the steam as rapidly as the same may be condensed. The pipe C I have described as a steam-supply pipe, but instead of steam it may be used to supply heated air, acting as a flue, and in which case it may be connected with a furnace by any suitable and convenient means. This fact I mention because in evaporating some liquids the employment of heated air is preferable to that of steam. E E are a series of concave trays, or conveyers, arranged one under each of the deflecting-chambers A A. These trays or conveyers are supported by being hung to the branch pipes $d\ d$ of the pipe D, or by any other suitable means. The diameter of these trays is greater than that of the deflecting-chambers A A, and which, in connection with the fact that they are arranged one below each deflecting-surface, causes the tray to catch the liquid as it drips or runs over the edge of the deflector and reconvey the same over its deflected surface toward the center of the apparatus, and discharging the same through its central opening e, Fig. 1, and around the heated wall of the central tube C, causes it to fall on the apex of the dome below, and so on throughout the entire series, until it finally reaches the vessel F, and from which it is drawn off through the pipe F', Fig. 2. G is a pipe or tube, and is designed to supply a blast of either hot or cold air. This tube is provided with a series of openings, g g, one of which communicates with the open space between each of the series of deflectors, and thus continuous blasts of either hot or cold air may be discharged between each of the sets of evaporating-surfaces, and which has the effect to drive out and dispel any dead steam which the moisture in the surface of the lenses A A may have developed, and which condensed vapor, if allowed to remain, would clog or choke up the passage through which the liquid is to pass, and which would thus impede its flow. H is a feeder or liquid supply, and may be funnel-shaped, or of any other desired form. At its lower section it is provided with a series of openings, h h, and through which the liquid is discharged, as it were, in fine jets, and which so separates its volume as to cause it to flow in a thin stratum down over the upper deflector, and so on throughout the entire series. In the accompanying drawing I have illustrated a series of six deflectors or trays as constituting the series, but, of course, their number may be increased or diminished, as the character of the liquid to be evaporated may render desirable, and without in any manner affecting the principle of their operation as involved in my present invention. K is a wooden or metallic casing, and which may be made to inclose the entire evaporating mechanism, and is chiefly desirable in protecting the operator from the effects of the vapors. This can be constructed so as to be partially or entirely removable, and which permits of free access being had to the deflecting-chambers and other portions of the apparatus.

From the foregoing full and detailed description the operation of my apparatus will readily be understood.

The pipe C' is connected with a steam-boiler or so attached to an engine conveniently situated as to receive and utilize its exhaust steam. The steam passes in through the pipe C' and up through the pipe C, and through its openings enters each of the chambers B B, and thus the convex evaporating-surfaces of the deflecting-chambers A A are all heated to a uniform temperature; and so soon as any of the steam in the chamber is condensed it is, through the branch pipes d d, conveyed to the discharge-pipe D, and thus carried off; or, instead of steam, heated air may be supplied through the tube C, as before explained. The liquid to be evaporated is now fed or supplied to the funnel-shaped vessel H, and, instead of flowing out in large quantities or bulk through the small openings or apertures h h, it is separated and supplied in small jets or streams, and runs or trickles down over the convex surface of the upper deflector in a thin stratum or sheet, and in such quantities as to insure its most rapid and effective evaporation. The liquid, as it now flows or falls over the deflector, as indicated by arrows, falls and is caught on the tray E below, and runs down over its deflected and concave surface, and passes down through its opening e, falling down around the heated surface of the central tube C on the deflector below, and at or near the center thereof, and then down over the next deflector until it reaches the vessel F, and from which it is drawn off by the pipe F', Fig. 2. During the process blasts of either hot or cold air are fed through the pipe G and discharged through its apertures or openings g g between each of the series of deflecting-chambers.

This apparatus is most admirably adapted for evaporating all saccharine juices or sirups; and also can be most advantageously used in the treatment of all liquids in connection with which an evaporating apparatus is now used; and it is also admirably adapted for use in connection with the distillation of cologne.

I am aware that, in an evaporating and cooling apparatus, convex and concave dishes or pans, attached to a shaft, so as to secure a rotary movement, and the same then secured in a jacketed casing, have been used, and, therefore, to such an arrangement I lay no claim, as my deflector is not a rotary dish or pan, but a stationary plano-convex chamber.

What I claim as new, and desire to secure by Letters Patent of the United States, is—

1. The plano-convex deflecting-chambers A A, trays E E, and central steam or hot air tube C, the whole being combined as described, whereby the liquid to be evaporated, as it runs off the deflecting-surface, is caught in the tray below and reconveyed to the center of the apparatus and discharged on the deflecting-surface below through an opening around the heated surface of the tube C, as and for the purpose specified.

2. The deflecting-chambers A A, trays E E, pipe G, having openings g g for discharging a blast of either hot or cold air between each of the series of deflectors, as and for the purpose specified.

In testimony whereof I have signed my name to this specification in the presence of two subscribing witnesses.

F. RANDON.

Witnesses:
EDWIN JAMES,
JOS. T. K. PLANT.